United States Patent
Janssen et al.

(10) Patent No.: US 6,937,854 B2
(45) Date of Patent: Aug. 30, 2005

(54) APPARATUS FOR CONDUCTING A CONFERENCE CALL BETWEEN A WIRELESS LINE AND A LAND LINE USING CUSTOMER PREMISE EQUIPMENT

(75) Inventors: Holger Janssen, Richmond (CA); Steve Kropp, Surrey (CA)

(73) Assignee: VTech Telecommunications, Limited, Tai Po (HK)

( * ) Notice: Subject to any disclaimer, the term of this patent is extended or adjusted under 35 U.S.C. 154(b) by 404 days.

(21) Appl. No.: 10/337,184

(22) Filed: Jan. 6, 2003

(65) Prior Publication Data

US 2003/0157929 A1 Aug. 21, 2003

Related U.S. Application Data

(60) Provisional application No. 60/345,217, filed on Jan. 4, 2002.

(51) Int. Cl.$^7$ ................................................ H04M 3/42
(52) U.S. Cl. ..................... 455/416; 455/462; 455/550.1; 455/554.2; 455/556.1
(58) Field of Search ................................ 455/416, 462, 455/550.1, 552.1, 554.2, 556.1

(56) References Cited

U.S. PATENT DOCUMENTS

| | | |
|---|---|---|
| 5,450,471 A | 9/1995 | Hanawa et al. |
| 5,526,403 A | 6/1996 | Tam |
| 5,715,296 A | 2/1998 | Schornack et al. |
| 6,314,303 B1 * | 11/2001 | Phipps ........................ 455/555 |
| 6,366,784 B1 | 4/2002 | Hsueh |
| 2002/0072390 A1 | 6/2002 | Uchiyama |
| 2002/0102974 A1 * | 8/2002 | Raith ......................... 455/434 |
| 2004/0072544 A1 * | 4/2004 | Alexis ........................ 455/74.1 |
| 2004/0132485 A1 * | 7/2004 | Charney et al. .......... 455/552.1 |

* cited by examiner

*Primary Examiner*—Nguyen T. Vo
*Assistant Examiner*—Julie E. Stein
(74) *Attorney, Agent, or Firm*—Pillsbury Winthrop Shaw Pittman LLP

(57) ABSTRACT

An apparatus and method for conducting a conference call between a wireless line and a land line using customer premise equipment, where a cordless telephone device connected to the PSTN includes a wireless telephone cradle for receiving a cellular telephone. Interface circuitry residing in the cordless telephone controls operation of the cordless telephone handset and the cellular handset when positioned in the cradle and connects a first call between a user and a first party via the PSTN and a second call between the user and a second party via the wireless telephone network toward establishing a conference call among the user, the first party and the second party. Echo cancellation and suppression is provided to minimize objectionable echo between the two far end parties.

4 Claims, 4 Drawing Sheets

US 6,937,854 B2

APPARATUS FOR CONDUCTING A CONFERENCE CALL BETWEEN A WIRELESS LINE AND A LAND LINE USING CUSTOMER PREMISE EQUIPMENT

This application claims the benefit of Provisional Appl. No. 60/345,217, filed Jan. 04, 2002.

BACKGROUND OF THE INVENTION

1. Field of the Invention

The present invention relates in general to telephone communications via cellular ("wireless") telephone systems and landline ("wired") telephone systems. In particular, the invention relates to an apparatus for making and receiving cellular telephone calls via cordless telephone handsets associated with a cordless base unit having an integrated cradle for receiving a cellular telephone handset and further providing the user with the ability to conference together a call on a wireless line with a call on a land line using an integrated device and without having to subscribe for such conference call services from a communication service provider.

2. Background Art

Cellular telephone handsets have become increasingly popular with individuals who enjoy the portability and convenience that these wireless communication devices provide. Increasingly, cellular telephone users are finding that cellular telephone handsets can provide a reliable complement or even an alternative to traditional wireline telephone services, namely the public switched telephone network (PSTN).

Cellular telephone handsets are increasingly used to provide a second, or even a third phone line to complement traditional wired telephone services in a residence or office. For example, when an individual wishes to place a telephone call but cannot because the conventional wired telephone line is currently being used by someone else engaged in a call or by a computer connected to the Internet, the individual may use a cellular telephone handset rather than wait for the wired telephone line to become available. Many families elect to provide cellular telephone handsets to their teenage children who would otherwise frequently occupy the home's wired telephone line(s) with their often ample telephone use. The use of a cellular telephone handset in such situations is a convenient solution and often one that that is less expensive than installing and maintaining a second wired telephone line at the residence or office.

With increasing frequency, individuals are opting to use cellular telephone service to replace altogether traditional wired telephone service in the home or office. By using a cellular telephone handset exclusively, these individuals can easily maintain the same phone number when moving to a new house or apartment while also avoiding costly installation fees associated with ordering and installing new telephone service. Further, by carrying their cellular telephone handset with them when away from the residence, these individuals have access to all incoming phone calls that would otherwise go unanswered or be directed to voice mail or an answering machine if directed to the home wireline telephone.

The use of a cellular telephone handset as a primary means of communication for a residence or office does have certain limitations. For example, only one person can use the cellular phone at a time because there is generally only one handset assigned to a given cellular telephone number. Moreover, unless the user is carrying the cellular phone handset when the handset rings, the user may have difficulty locating the phone or may not hear the phone ring at all since only a single handset rings—instead of each of the one or more conventional wired telephone sets which ring when an incoming call is received. If the user desires multiple extension phones as is common with wired telephone service, the user must purchase of additional cellular telephones, yet each will have a unique phone number, a significantly more costly solution than simply connecting another conventional wired telephone to the wired system carrying traditional wired telephone services.

Telecommunication features which have long been common in the business environment are increasingly being made available to the home user. Among such features is conference calling where three or more parties can join together in a single conversation. Typically such functionality is a value added feature offered by a telecommunication service provider on a paid for subscription basis.

Moreover, even where available and purchased by the user, the conference call feature is nevertheless dedicated to either the PSTN or wired communication service provider. Accordingly, while two or more PSTN calls can be conferenced and while two or more cellular/wireless calls can be conferenced together, each network service provider requires a fee.

There exist devices that facilitate the use of a cellular phone as a primary telephone communications device for a residence or office. One such device is described in U.S. Pat. No. 5,526,403 issued to Tam, which integrates wireline telephone functionality into a portable cellular telephone. While this device integrates standard wireline functionality into a cellular handset, the device suffers from many of the limitations of a regular cellular telephone when used in a residence or office.

A further device is disclosed in Published Application No. 20020072390A1 assigned to Meridian Concepts L.L.C. Therein is disclosed an apparatus and method of integrating a wireless telephone and a cordless telephone wherein a docking station is provided for interconnecting telephone calls between a wireless telephone and a cordless telephone. The apparatus includes an electrical interface having connectors for coupling audio and data signals with the wireless telephone; a transceiver to communicate calls via radio signals to the cordless telephone and a controller to communicate data signals with the wireless telephone operable to process telephone calls between the wireless telephone and the cordless telephone via said transceiver. No disclosure is made of the ability to connect a call made to or from the wireless phone with a call made to or from the cordless phone.

Another device that facilitates the use of a cellular telephone in a home or office is called VOX.LINK. VOX.LINK is a stand-alone cellular telephone base station that enables the use of home or office phones to answer and place cellular phone calls. The device consists of an external docking cradle, in which a cellular phone is seated, that is connected to other phone extensions via the telephone wiring within the residence or office. Two-line wiring at the location as well as dual-line extension telephones are required if the cellular telephone is to be used as a second phone line for the location. The Vox.Link may also be connected to multiple extensions via a wireless link if the device is connected to a multiple handset cordless telephone system base station, however the cordless system must be a multi-line cordless telephone system.

Furthermore, the Vox.Link device is not coupled to the existing wired or cordless extensions within the residence or office and accordingly the full functionality of the cellular phone is not transferred to those extensions. Such a system also generates telephone line voltages and ringing signals, and further requires dual tone multiple frequency (DTMF) pulse dial detection circuitry to enable the placing of calls from extensions over the cellular handset. This required circuitry increases the cost and complexity of such a device.

Accordingly, it is an object of the present invention to provide an apparatus which permits a user to establish a conference call between at least two other parties where a call to a first party is made via the wireless phone and a call to a second party is made via a cordless phone whereby the two calls are conferenced together such that all three parties can participate in the call.

It is a further object of the present invention to provide a fully encapsulated apparatus which permits a user to establish a conference call between at least two other parties using customer premises equipment without the need to subscribe to or pay a telecommunication service provider for the conference calling feature.

Another object of the present invention is to provide an apparatus which permits a user to establish a conference call between one party connected via the PSTN network, one party connected via the wireless network and up to three internal extension cordless handsets.

It is yet another object of the present invention to provide an apparatus which permits a user to establish a conference call between at least two other parties via a wireless phone and a cordless phone where echo cancellation and echo suppression is included in the path between the two far end callers to prevent objectionable echo from being heard.

These and other objects of the present invention will become apparent in light of the present specification, drawings and claims.

SUMMARY OF THE INVENTION

An apparatus for conducting a conference call between a wireless line and a land line using customer premise equipment is disclosed. The present invention comprises a cordless telephone handset and a base unit connected to the public switched telephone network. The base unit is further operable to communicate with the cordless handset via radio signals toward permitting a user to make and receive telephone calls using the cordless handset and further includes a wireless telephone cradle for receiving and establishing electrical connection with a wireless telephone handset itself capable of making and receiving calls over a wireless telephone network. Interface circuitry resides in the base unit for controlling operation of the cordless telephone handset and the wireless telephone handset when it is positioned in the cradle. The interface circuitry serves to control the operation of the apparatus and specifically permits connecting a first call between a user and a first party via the public switched telephone network and a second call between the user and a second party via the wireless telephone network toward establishing a conference call among the user, the first party and the second party.

In one embodiment of the present invention the interface circuitry further includes a DSP which implements echo cancellation and/or echo suppression to minimize objectionable audible echo during a conference call established among the public switched telephone network and a wireless telephone network.

The present invention further comprises a method of conducting a conference call among multiple parties via both the public switched telephone network and a wireless telephone network using an integrated telecommunication device including a cordless telephone handset, a base unit connected to the public switched telephone network, and having a cradle for receiving and connecting to a wireless telephone handset and interface circuitry for controlling operation of the cordless telephone handset and the wireless telephone handset when positioned in the cradle. The method of the present invention comprises the steps of: establishing a first telephone call between a user and a first party via the public switched telephone network; establishing a second telephone call between a user and a second party via a wireless telephone network; and connecting the first telephone call and the second telephone call whereby the user, the first party and the second party can each speak to and hear one another.

DETAILED DESCRIPTION OF THE DRAWINGS

Figure 1:
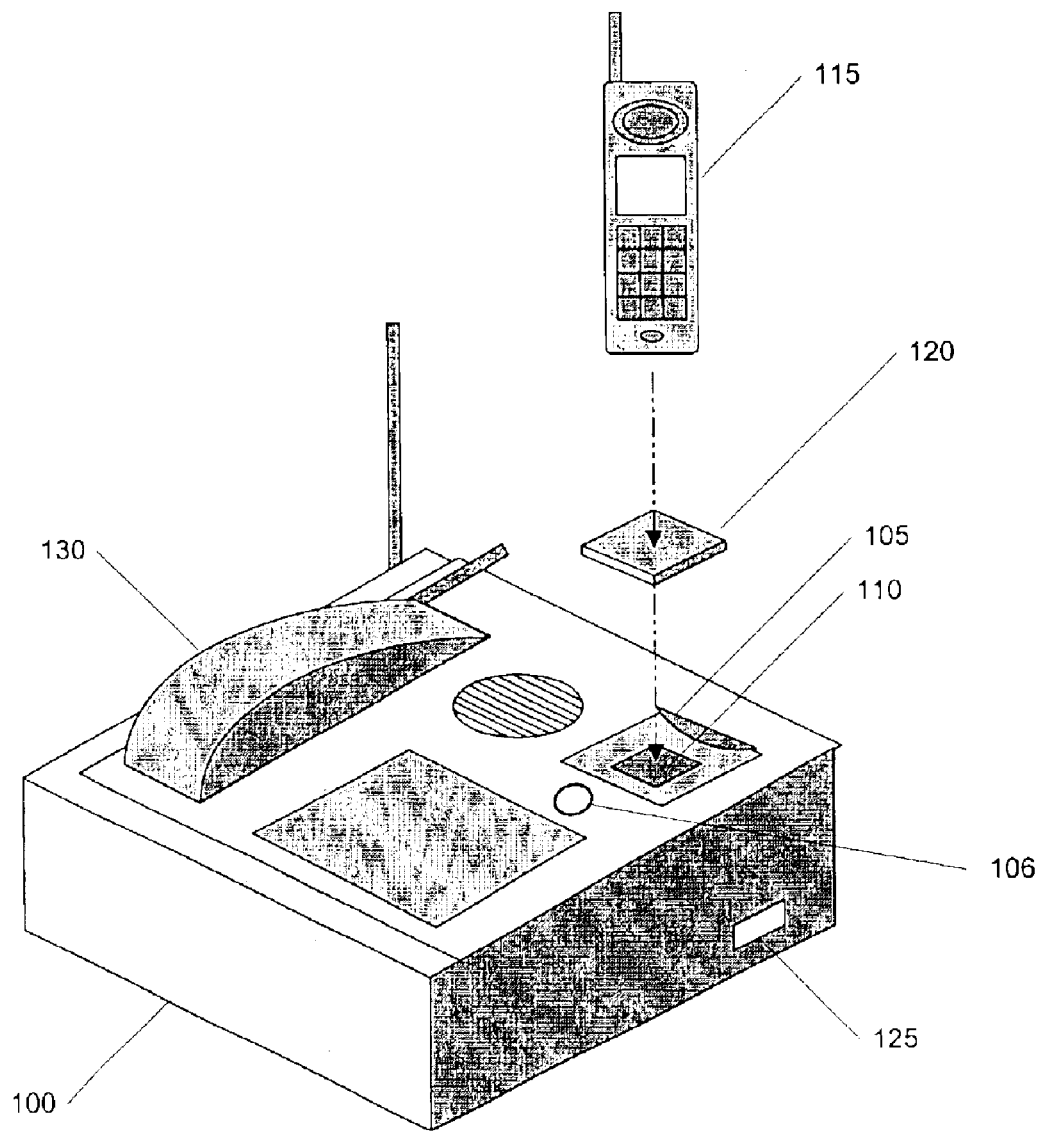
FIG. 1 is a drawing of a multi-line cordless phone with integrated cradle for cellular handset.

While this invention is susceptible to embodiment in many different forms, there are shown in the drawings and will be described in detail herein a specific embodiment, with the understanding that the present disclosure is to be considered as an exemplification of the principle of the invention and is not intended to limit the invention to the embodiment illustrated.

FIG. 1 illustrates a multi-line cordless phone system with integrated cradle for cellular handset according to the present invention. The system is shown comprised of cordless base unit 100, keypad 112, conference button 106, docking cradle 105 and mating connector 110. Cellular handset 115 slides into docking cradle 105. Cradle adapter 120 fits between docking cradle 105 and cellular handset 115, and serves to couple the various electrical contacts or input/output ports of handset 115 to the associated connection points of mating connector 110. Cradle adapter 120 is further designed to conform to the physical shape or form factor of cellular handset 115. While cradle adapter 120 could be optional if docking cradle 105 and connector 110 are particularly adapted to the design of cellular handset 115, it is contemplated that different cradle adapters may be provided to couple base unit 100 to cellular handsets of differing models or from different manufacturers that may have different input/output port configurations and/or different form factors.

Once seated in docking cradle 105, cellular handset 115 is in electrical communication with base unit 100 such that the functionality of handset 115 is available to base unit 100, and whereby cordless handset 130 or other handsets associated with base unit 100 may place or receive cellular telephone calls via cellular handset 115 as well as may place or receive telephone calls via the wired public switched telephone network (PSTN).

Connector 125 comprises a serial data connector that may be used to couple the base unit 100 to an external data peripheral such as a personal computer (PC) whereby such peripheral devices can communicate and/or control communications over the cellular system and PSTN.

Figure 2:
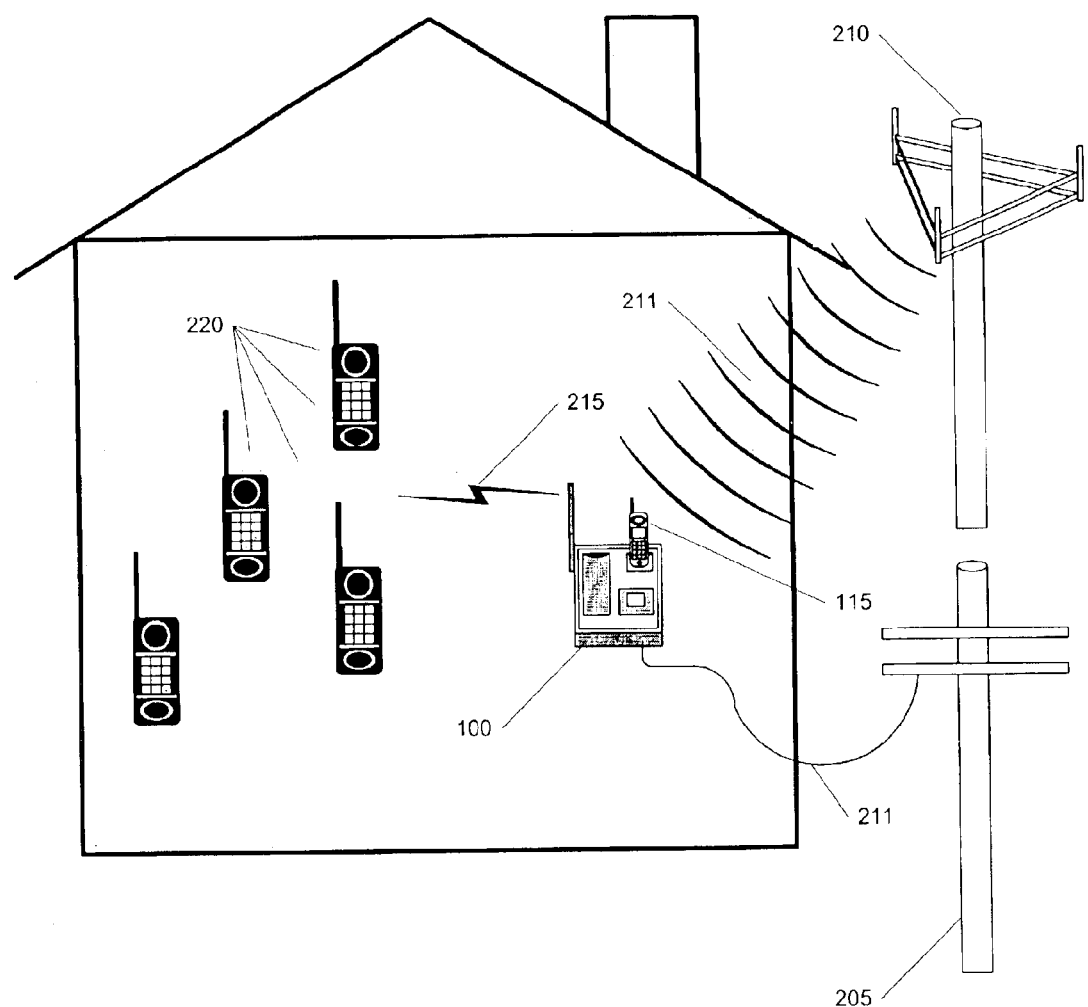
FIG. 2 is a diagram depicting the embodiment depicted in FIG. 1 coupled to both wireline and cellular telephone networks.

FIG. 2 illustrates an embodiment of the multi-line cordless phone of FIG. 1 used in a residence or office environment. When cellular handset 115 is coupled to cordless base unit 100 as described in FIG. 1, base unit 100 may then place and receive calls over cellular network 210. Base unit 100 is also shown coupled via a standard phone jack to public switched telephone network (PSTN) 205. This enables the base unit to place and receive calls over the PSTN, however, and without departing from the invention, the base unit is able to operate independently of the wired telephone connection by providing telephone connectivity solely via the cellular network.

Base unit 100 is shown coupled to a plurality of cordless handsets, indicated generally by 220, via local wireless communications link 215. Cordless handsets 220 may be distributed throughout a residence or office location thereby providing multiple extensions throughout the location. Each cordless handset extension may then access the functionality of cellular handset 115 coupled to base unit 100, as well the PSTN when base unit 100 is also coupled to PSTN 205.

One application for the embodiment of FIG. 2 is to facilitate a wireless mini public branch network system whereby multiple cordless handsets 220 can place calls to the outside world using cellular communications link 211 and cellular network 210, via the local wireless network created by local wireless communications link 215. The multiple handset cordless system allows conferencing of users, call transfer and intercom features among cordless handsets 220, through implementations such as those existent amongst multi-handset cordless telephone and wireless PBX systems. However, the base unit need not be connected to PSTN 205 to take advantage of such functionality among handsets 220.

An additional feature of the system of FIG. 2 is the ability to establish a conference call using both the PSTN and wireless telecommunication provider networks.

Yet another feature provided by the system of FIG. 2 is the ability to use the cellular handset associated with base unit 100 to provide second line phone service (or, for example, third line service if base unit 100 includes connections to two PSTN lines) to the residence or office and to distribute this service to multiple cordless extension handsets 220 supported by the system. Because the cellular handset is not permanently attached to the device, the user may elect to remove the cellular handset from the docking cradle whenever he or she leaves the residence or office and to then proceed to use the cellular handset like a standard portable cellular phone.

Figure 3:
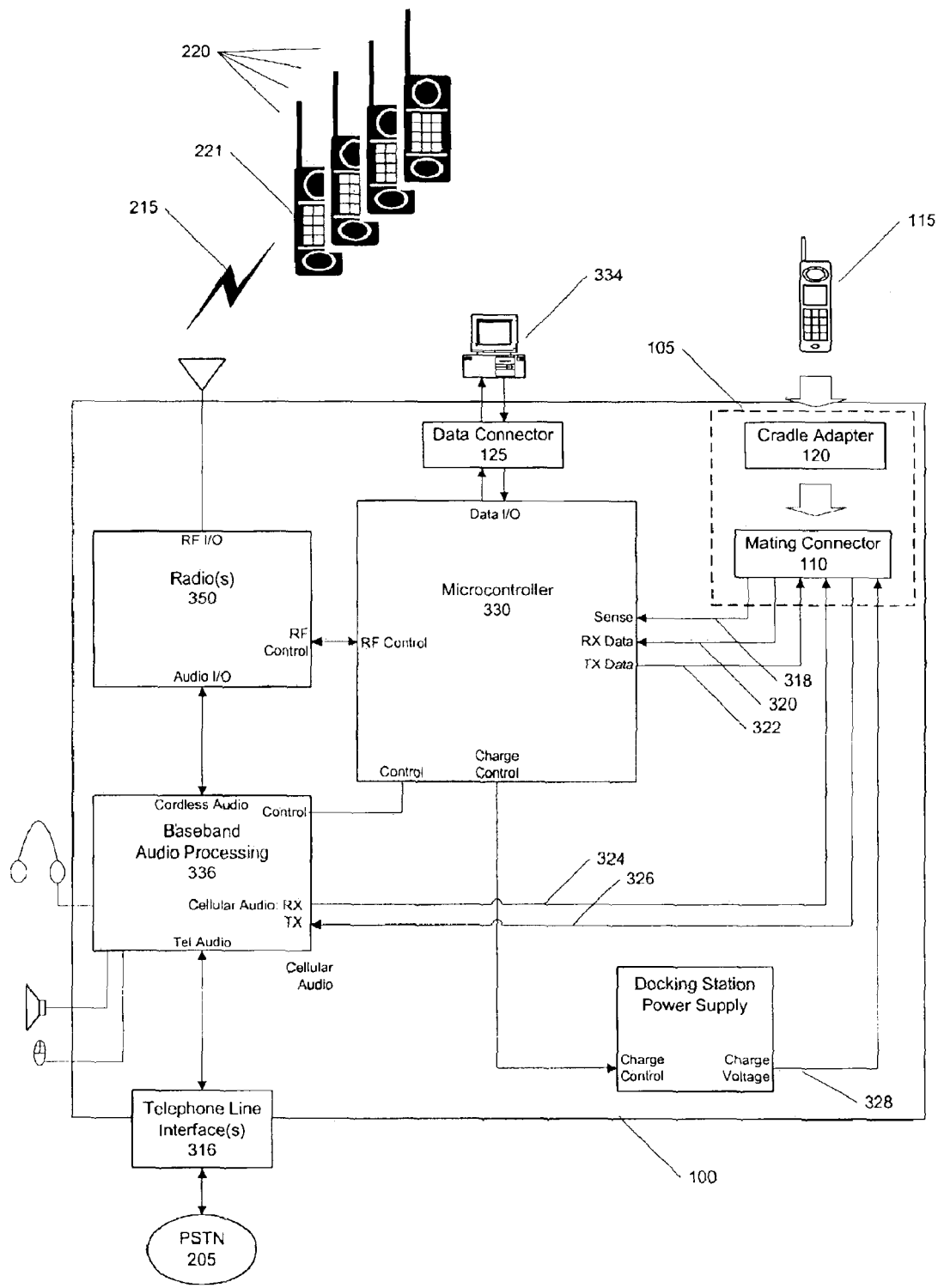
FIG. 3 is a functional block diagram of the phone depicted in FIG. 1.

FIG. 3 is a functional block diagram of multi-line cordless phone 100. As described in FIGS. 1 and 2, cellular handset 115 is coupled via docking cradle 105 and cradle adapter 120 to mating connector 110 of base unit 100. Multiple cordless handsets 220 communicate via wireless link 215 with base unit 100. Base unit 100 may further be coupled to PSTN 205 via telephone line interface(s) 316. Through these various connections, communications links can be established between the cellular handset, the wireline interface, the base unit and/or one or more cordless handsets.

Several input-output signal lines are coupled between base unit 100 and cellular handset 115. These signal lines include sense 318, charge voltage 328, RX data 320, TX data 322, RX cellular audio 324 and TX cellular audio 326. Further input-output signals are coupled between base unit 100 and an external device such as personal computer 334 via data connector 125.

Sense line 318 is coupled to cordless base microcontroller 330 to detect the presence of a cellular handset coupled to mating connector 110. Charge voltage line 328 provides sufficient voltage and current to charge a typical cellular handset battery when the handset is seated in the docking cradle. Because of differences in specifications that are possible between cellular telephones from different manufacturers, additional circuitry may be integrated in cradle adapter 120 to adapt the charge voltage and/or current to conform to the requirements for a specific model of cellular handset.

An optional RS-232 type data connector 125 allows for the connection of computing device 334 to base unit 100 and associated cellular phone 115. This data connection would allow computing device 334, for example, to connect to the Internet via either or both of the cellular or wired telephone networks. In FIG. 3, computing device 334 is depicted to be a PC, but is not limited to such a device.

Signal lines RX data 320 and TX data 322 are the serial data lines over which non-voice data traffic between microcontroller 330 and cellular handset 115 is carried. Typical cellular phones provide such a serial data connection to interface with an external data peripheral such as a PC or a wireline or wireless modem. Typically, a GSM cellular telephones supports an AT-command interface, and depending upon the cellular phone standard used, the AT-command sets offer advanced features that can be accessed through the cellphone's serial communications port. Other cellular or wireless telephones use proprietary command sets that provide similar functionality. In the case of GSM, a standard AT-command set is defined under ETSI GSM 07.07 that supports dialing, incoming call detection, caller ID support and other features. Because of differences in cellular telephone specifications between manufacturers, additional signal conversion circuitry may be integrated into cradle adapter 120 specific to each model of cellular handset such that serial data communications between the handset and microcontroller are possible.

Most cellular phones also provide transmit and receive audio signals out of an interface connector to support external headsets or hands-free devices. Lines RX cellular audio 324 and TX cellular audio 326 couple transmit and receive audio voice traffic from and to cellular handset 115 and baseband audio processing circuitry 336, respectively.

Microcontroller 330, once having detected the presence of cellular handset 115 on sense line 318, issues AT-commands over the handset serial interface, RX Data 320 and TX Data 322, to query if handset 302 is ready-to commence serial communications. Once serial data communication has been established, microcontroller 330 notifies cordless handsets 220 that cellular services are available for use by the cordless system in addition to any primary or secondary telephone lines via PSTN 205. If cellular handset 115 is removed from cradle adapter 120, microcontroller 330 signals to cordless handsets 220 that the cellular line and services are no longer available for use by cordless handsets 220.

When a user of cordless handset 221 from amongst handset group 220 wishes to commence an outgoing call on the telephone line associated with cellular handset 115, the user presses an appropriate button on cordless handset 221 to select the cellular line and waits for a dial tone, or begins predialing the digits, wherein digits are entered prior to establishing a dial tone. Because a cellular phone line does not normally generate dial tone, microcontroller 330 can be configured to cause the output to cordless handset 221 of a locally generated dial tone if the PHONE key is pressed prior to entering digits, thereby providing the user with a more intuitive cordless telephony experience.

The call digit data from cordless handset 221 is passed to microcontroller 330 via local wireless communications link 215. The data is buffered and once microcontroller 330 determines that the user has completed entering the phone number, the microcontroller signals cellular telephone 115 using AT commands (e.g. AT D 123456789) to cause cellular telephone 115 to dial the number string and to place a call via cellular network 210.

Microcontroller 330 monitors the call progress using the AT command interface until the call is connected and a conversation may begin. The microcontroller then routes the call audio signals to and from cellular handset 115 over lines RX cellular audio 324 and TX cellular audio 326. If the user completes the call and presses the OFF key on cordless handset 221, a termination event is transmitted to cordless base 100 via local wireless link 215, and microcontroller 330 terminates the cellular call at cellular handset 115 using an appropriate AT command. Alternatively, if a call termination event is indicated by cellular network 210 and received by cell phone 115, an appropriate AT command is conveyed to microcontroller 300 via line 320, and the termination event is conveyed to cordless handset 221 via local wireless link 215.

When an outgoing call via the cellular network is not in progress, microcontroller 330 periodically checks serial interface lines 320 and 322 for the AT command indication of an incoming cellular call. If it is determined that an incoming call is present, microcontroller 330 signals to notify cordless handsets 220 of the incoming cellular call. When a user of a specific cordless handset, e.g. handset 221, answers the incoming call, the cordless handset signals microcontroller 330 to open a connection. Microcontroller 330 then instructs cellular handset 115 via AT commands to answer the call and then enables and routes the audio paths 324 and 326 from the cellular phone by way of baseband audio processing 336, base unit transceiver 350 and local communications link 215 to the appropriate cordless handset 221. The call is then similarly conducted and terminated, as was the case for an outgoing call previously described. This automatic detection and direct handling of the incoming cellular handset call removes the need to apply manual call forwarding of such incoming cellular calls to the cordless system via the PSTN. Baseband audio processor 336 is shown providing connection to headphones and speakerphone, comprising a speaker and microphone.

Because the system can provide for close coupling of both audio and data signals among the cellular handset, the base unit and the cordless handsets, various types of data may be shared among the devices. For example, during an incoming call, cellular phone 115 can transmit using AT commands the phone number of a caller (caller identification or caller ID data) received from cellular network 210 to cordless base microcontroller 330. This caller ID information can then be passed on to cordless handsets 220 via local wireless communications link 215. The caller ID information received from the cellular phone can then be stored in the cordless handsets and/or in the base unit and presented in coordination with the caller ID information collected by the cordless base unit from calls received from PSTN 205. This allows for the maintenance of a unified listing in a single call log of all calls received over both the cellular and landline systems which can be readily accessed by any wireless extension of the system.

If the cellular handset has messaging functionality, text messages received from cellular network 210 by cell phone 115 are conveyed to the base unit via the AT command interface and are forwarded to the cordless handsets, similarly to the caller ID information. The command interface of the cell phone may also provide access to other information e.g. wireless mailbox message notification and call log review either through AT commands or through proprietary commands. In cases such as one in which cellular telephone 115 operates according to a standard such as GSM, access to the contents of a cell phone SIM card via a command interface such as AT commands enables the retrieval by base unit 100 of messages or-other data stored in the SIM card. Other data sharing functionality is provided as well. When a cellular handset is placed in the cordless base cradle, upon detection of the cellular handset the cordless base unit queries the cellular handset to determine the current list of phone book entries stored within the cellular handset. Such entries can be added to a list maintained in the cordless base unit to provide a unified comprehensive list. The two lists based may be further "synchronized" based upon the date of each entry such that a unified list comprised of the most up-to-date entries among both the cellular and cordless handsets is maintained within base unit 100 and/or cellular handset 115.

While conferencing two PSTN phone lines is common on multi-line telephones, the present invention must resolve echo problems caused by long delays in the wireless phone transmission. Without implementing active echo control devices the calling party on the wireless line will hear echo reflected from the calling party on the PSTN line.

According to ITU-T G.131 standard it is recommended that the network deploy active echo control devices on all connections which exceed the total one-way echo transmission path time of 25 ms. Most PSTN phone lines have less delay than 25 ms so do not deploy echo control devices. Wireless transmissions may have greater than 100 ms delay, so wireless networks deploy echo control devices. According to ITU-T G.131, subjective testing shows that the longer the delay, the more objectionable the echo becomes. The termination at the wireless trunk must be designed to give a high echo return loss so that the signal reflected back to the caller meets the requirements in ITU-T G.131. The wireless network may also deploy network echo cancellers and network echo suppressors to achieve the requirements.

When the wireless call is conferenced with the PSTN call, a portion of the signal sent from the calling party on the wireless line is reflected from the 2-wire to 4-wire termination of the phone connected to the PSTN line of the second calling party. Since the PSTN network has little delay, a much higher amplitude of reflected signal is tolerated by the PSTN network than is the case for the wireless network. When this reflected signal is transmitted back across the cell network the additional delay makes the echo objectionable.

Accordingly the present invention further employs an echo canceller and echo suppressor in the path between the two far end callers during conference mode. Echo cancellation/suppression is implemented in a DSP within Baseband Audio Processing 336 and tuned by parameters configured by the microcontroller 330.

Figure 4:
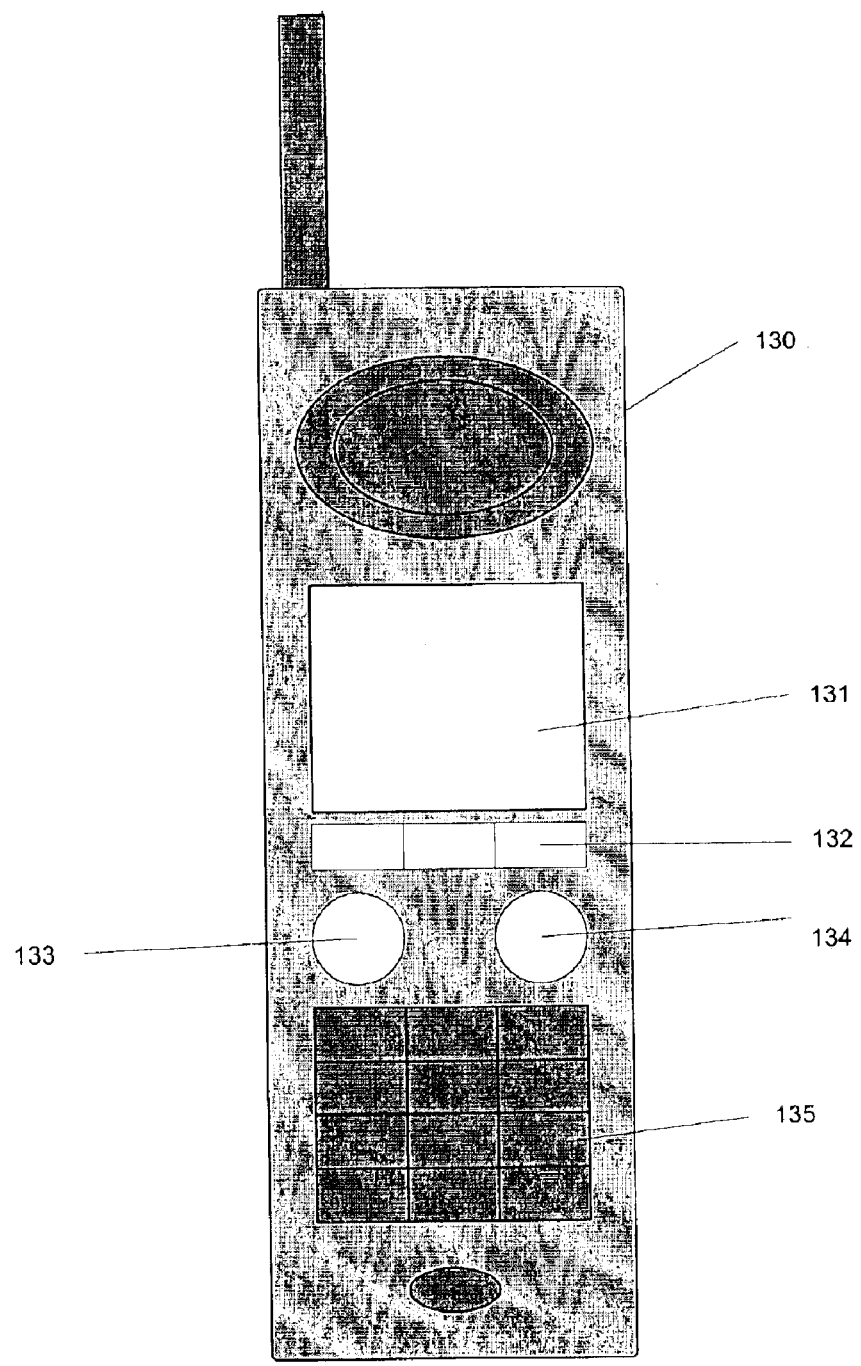
FIG. 4 is a drawing of a cordless handset according to the present invention of FIG. 1.

FIG. 4 illustrates a cordless handset 130 according to the present invention. Handset 130 includes LCD display 131 which provides visual indication to the user relative to the operation of the handset, including menu driven command options which can be selected and actuated by soft keys 132 which take on different functions according to the menu being displayed. "Home" button 133 serves to select a PSTN line for the purpose of making or answering a telephone call.

"Cell" button 134 serves to select a wireless line (provided via the wireless handset positioned in the docking cradle 105) of the purpose of making or answering a telephone call. Outgoing calls can be dialed using keypad 135.

In operation the present invention is capable of supporting conferencing of up to three cordless handsets, the cordless or "home" line, the wireless or "cellular" line and the base speakerphone on one or more conference calls (FIGS. 1 and 4). To establish a conference call the user makes or answers a first call by on either the home or wireless line. The user then places that call on hold and makes or answers a second call on the other of the home or wireless line. The user then presses the "conference" key 106 and thereby connects the user and the other two parties in a single call. Another user can press either the "home" or "cell" buttons, 133 or 134, on the base unit or any cordless handset to join the conference call. To drop a party or line to the conference call the user can press the "drop" button (a soft key 132) on the handset 130. A menu will be displayed offering the user the ability to drop the home line, the cell line or both lines. The user scrolls to the desired option and pressed the "ok" button, another soft key 132.

The foregoing description and drawings merely explain and illustrate the invention and the invention is not limited thereto, inasmuch as those skilled in the art, having the present disclosure before them will be able to make modifications and variations therein without departing from the scope of the invention.

What is claimed is:

1. An apparatus for conducting a conference call between a wireless line and a land line using customer premise equipment comprising:

a cordless telephone handset;

a base unit connected to the public switched telephone network, the base unit further being operable to communicate with the cordless handset via radio signals toward permitting a user to make and receive telephone calls using the cordless handset;

the base unit further including a wireless telephone cradle for receiving and establishing electrical connection with a wireless telephone capable of making and receiving calls over a wireless telephone network;

interface circuitry residing in the base unit for controlling operation of the cordless telephone handset and the wireless telephone handset when positioned in the cradle; the interface circuitry further capable of connecting a first call between a user and a first party via the public switched telephone network and a second call between the user and a second party via the wireless telephone network toward establishing a conference call among the user, the first party and the second party.

2. The interface according to claim 1 further providing echo cancellation to minimize objectionable audible echo during a conference call established among the public switched telephone network and a wireless telephone network.

3. The interface according to claim 1 further providing echo suppression to minimize objectionable audible echo during a conference call established among the public switched telephone network and a wireless telephone network.

4. A method of conducting a conference call among multiple parties via both the public switched telephone network and a wireless telephone network using an integrated telecommunication device including a cordless telephone handset, a base unit connected to the public switched telephone network, and having a cradle for receiving and connecting to a wireless telephone handset and interface circuitry for controlling operation of the cordless telephone handset and the wireless telephone handset when positioned in the cradle, the method comprising the steps of:

establishing a first telephone call between a user and a first party via the public switched telephone network using said integrated telecommunication device;

establishing a second telephone call between a user and a second party via a wireless telephone network using said wireless telephone handset when said wireless telephone handset is received in said cradle of said base unit; and connecting the first telephone call and the second telephone call whereby the user, the first party and the second party can each speak to and hear one another.

* * * * *